United States Patent [19]
Brumley

[11] 3,743,135
[45] July 3, 1973

[54] DISPENSER

[76] Inventor: Charles E. Brumley, 2015 Saxon, Houston, Tex. 77018

[22] Filed: Dec. 21, 1970

[21] Appl. No.: 100,027

[52] U.S. Cl. ............................................. 221/205
[51] Int. Cl. .......................................... G07f 11/44
[58] Field of Search .................... 221/180, 183, 202, 221/203, 204, 205; 222/200, 199

[56] References Cited
UNITED STATES PATENTS

| | | | |
|---|---|---|---|
| 1,281,890 | 10/1918 | Strand | 221/205 X |
| 3,322,302 | 5/1967 | Beha | 221/205 X |
| 3,392,880 | 7/1968 | Wilcek | 221/205 |
| 1,012,106 | 12/1911 | Seavey | 221/204 X |
| 2,785,682 | 3/1957 | Neumair | 221/205 X |

*Primary Examiner*—Robert B. Reeves
*Assistant Examiner*—Thomas E. Kocovsky
*Attorney*—Hyer, Eickenroht, Thompson & Turner

[57] ABSTRACT

Apparatus is disclosed for dispensing a preselected number of generally cylindrical articles of substantially uniform length and diameter. The apparatus includes a hopper having two facing vertical walls and two facing walls that converge downwardly. The lower edges of the walls form an opening at the bottom of the hopper such that only one article at a time can pass through the opening. The articles, which may be cylindrical cardboard tubes containing pens or pencils, are stacked side by side in the hopper with their longitudinal axes perpendicular to the facing vertical walls. A dispensing means is mounted on the bottom of the hopper for receiving and dispensing a preselected number of the articles. The converging walls of the hopper are movable and at least one of the walls is moved inwardly of the hopper each time the dispensing means is actuated to rearrange the articles and break up any bridge formed by two or more articles wedging between the converging walls above the opening so that the flow of articles through the opening to the dispensing means is uninterrupted.

9 Claims, 4 Drawing Figures

PATENTED JUL 3 1973

Charles E. Brumley
INVENTOR

BY Hyer, Eickenroht
Thompson & Turner
ATTORNEY

PATENTED JUL 3 1973 3,743,135

Charles E. Brumley
INVENTOR

BY Hyer, Eickenroht,
Thompson & Turner
ATTORNEY

DISPENSER

This invention relates to dispensing apparatus generally, and in particular to apparatus for dispensing a preselected number of elongated, generally cylindrical articles.

This apparatus can be used to dispense from a hopper any generally cylindrical object and has found particular utility with coin-operated vending machines for pens and pencils. Hoppers, generally, have a large opening at the top with walls that converge downwardly to a smaller discharge opening at the bottom. Hoppers can, of course, be quickly and easily filled with the articles to be dispensed through the large opening at the top. The problem is that as they feed by gravity toward the smaller opening at the bottom, they can become wedged between the converging walls and form a bridge across the hopper between the walls that will support the articles above the bridge. This interrupts the supply of articles to the dispensing means below the hopper and requires a service call to break the bridge. It may also produce some irate customer who paid for a pen or pencil and did not get one.

To avoid the hopper bridging problem, some pen and pencil vending machines have used a rack with an individual shelf or hanger for each article. In operation, the articles are removed from the shelf or hanger one at a time and dispensed from the machine. One of the difficulties with this type of dispensing machine is that the pens must be loaded on the rack one at a time. This is a time-consuming operation which is undesirable. Further, such machines usually cannot store as many of the articles to be vended as the hopper type; or if they do, they inherently are taller and require more space.

It is an object of this invention to provide dispensing apparatus having a hopper to store the articles to be dispensed that will supply articles to the dispensing means of the apparatus as long as there are articles in the hopper.

It is an object of this invention to provide apparatus for dispensing elongated, cylindrical articles that stores the articles in a hopper and that rearranges the articles in the hopper each time a preselected number of articles are dispensed to break any bridge formed by the articles in the hopper.

These and other objects, advantages, and features of this invention will be apparent to those skilled in the art from a consideration of the specification, including the attached drawings and appended claims.

The invention will now be described in detail in connection with the attached drawings which show the invention embodied in a coin-operated apparatus for dispensing cylindrical articles.

Figure 2:
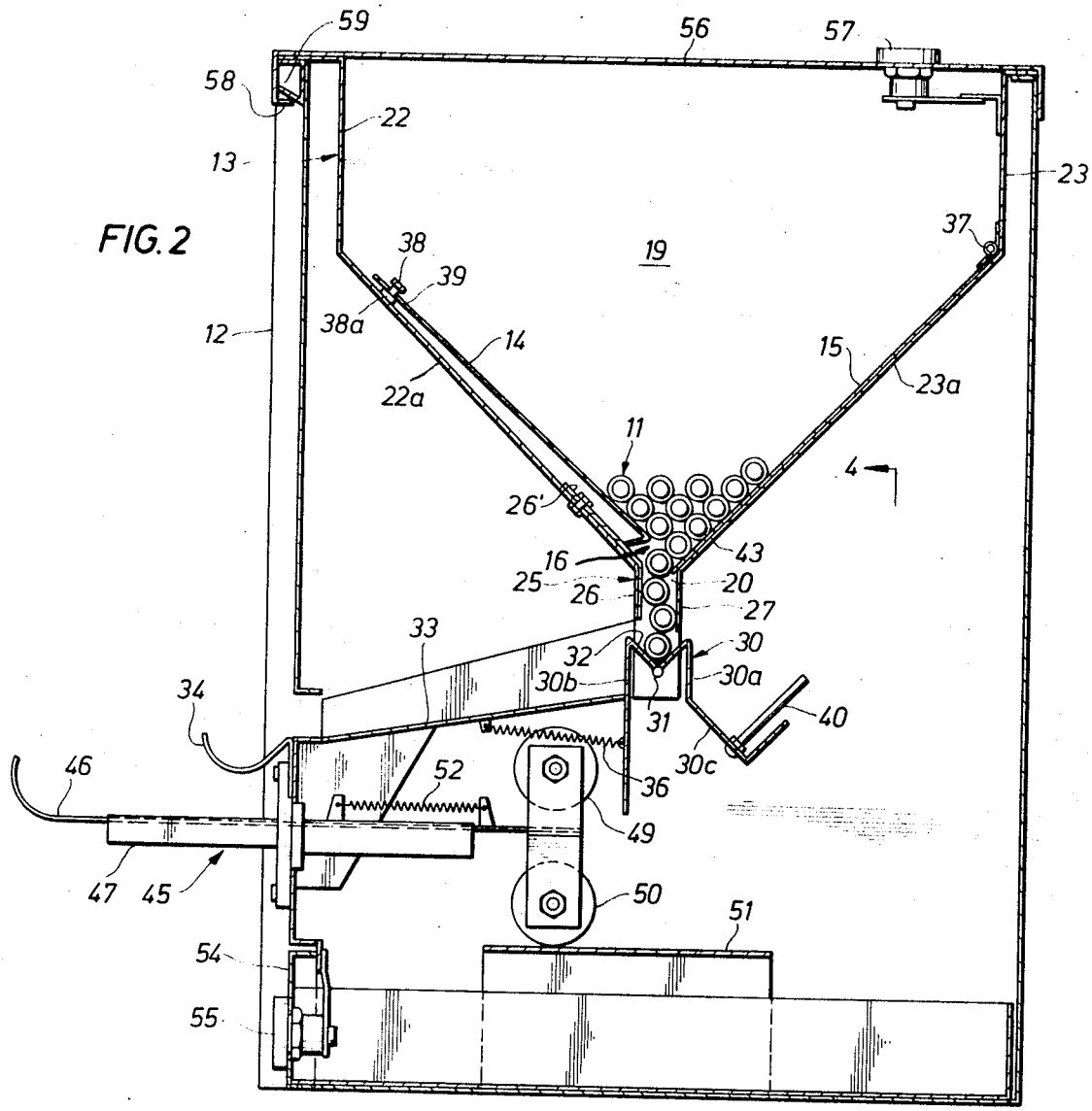
FIG. 2 is a sectional view of the dispensing apparatus taken along line 2—2 of FIG. 1 showing the apparatus in position to receive an article.
Figure 1:
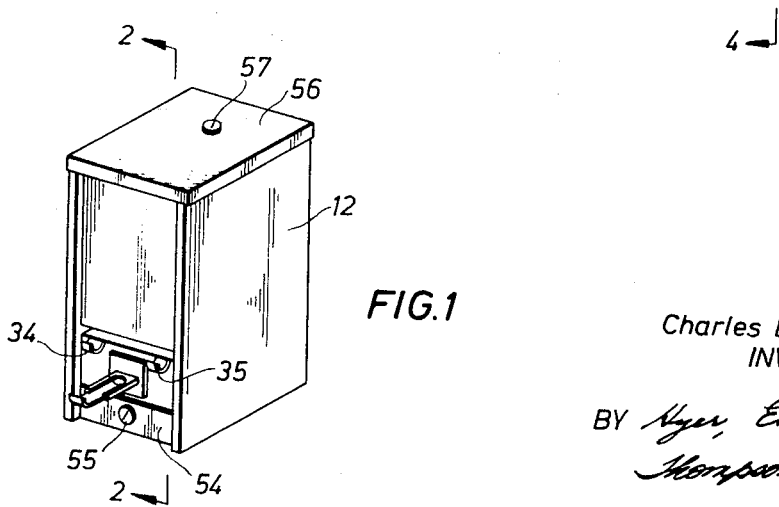
FIG. 1 is a perspective view of the preferred embodiment of the apparatus.
Figure 4:
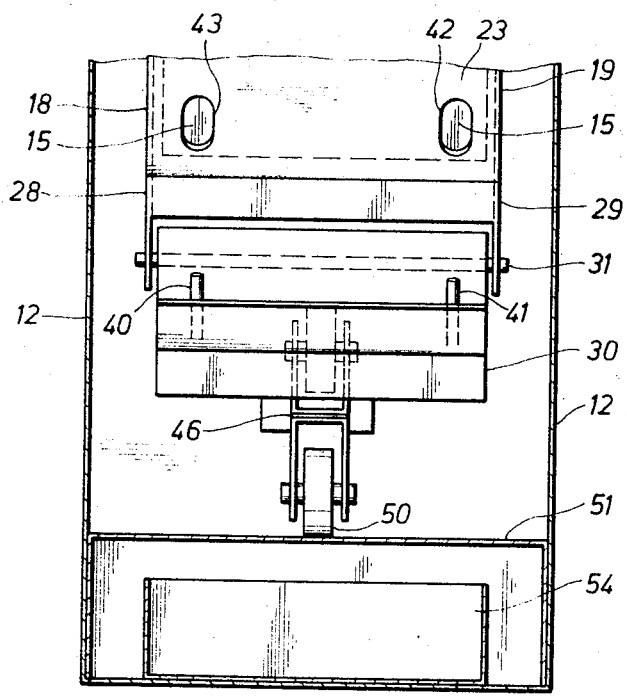
FIG. 4 is a sectional view taken along line 4—4 of FIG. 2.

In the embodiment shown in the drawings, the apparatus is dispensing one at a time cylindrical cardboard tubes 11, which may contain pens, pencils, or other commodities. The dispensing apparatus includes housing 12 in which hopper 13 of generally rectangular, horizontal cross section is mounted. The hopper has two facing walls 14 and 15 that converge downwardly and two facing walls 18 and 19. As shown in FIG. 4, walls 18 and 19 are generally vertical and parallel. They are spaced apart a distance slightly greater than the length of articles 11 so that the articles to be dispensed can be stacked in the hopper in side-by-side relationship with their longitudinal axes perpendicular to parallel walls 18 and 19, and the walls of the hopper will hold them in such relationship as they feed by gravity down through the hopper. The hopper has opening 16 at the bottom formed by walls 18 and 19 and the lower edges of walls 14 and 15. The distance between the lower edges of walls 14 and 15, as shown in FIG. 2, is such that only one article at a time can pass through the opening.

Hopper 13 further includes two facing walls 22 and 23 having downwardly converging lower portions 22a and 23a located outside of converging walls 14 and 15, respectively. Walls 22 and 23 are connected to parallel walls 18 and 19. The upper edges of walls 22 and 23 are bent over at right angles to engage the upper edge of housing 12 to support the hopper in the housing. The lower edges of walls 22 and 23 combine with walls 18 and 19 to form opening 20 below opening 16.

Chute 25 that includes walls 26, 27, 28, and 29 is mounted on the hopper below openings 16 and 20. The chute has a cross-sectional area substantially equal to the area of openings 16 and 20 so that articles pass through the chute one at a time. Wall 26 of the chute is not attached to the other walls of the chute. It has portion 26' that is connected to lower portion 22a of wall 22 by a bolt that extends through a slot (not shown) in the wall to permit the wall to be moved to change the width of the slot. This is desirable when the diameter of the articles being dispensed changes, so that the articles will continue to feed through the chute one at a time.

Figure 3:
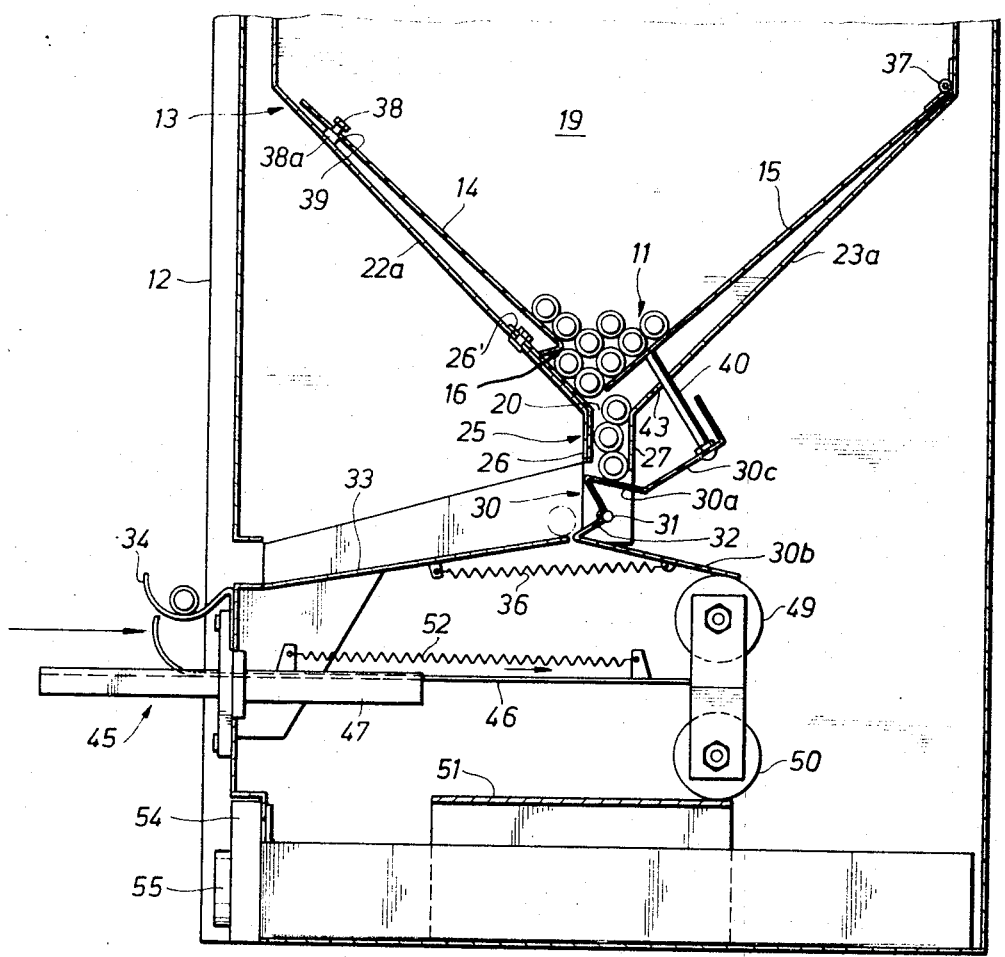
FIG. 3 is a sectional view similar to FIG. 2 showing the apparatus dispensing an article.

Dispensing member 30 provides means located below the hopper opening for dispensing a preselected number of the articles when actuated. Dispensing member 30 is mounted below chute 25 between extensions of chute walls 28 and 29 by shaft 31. The member is M-shaped in cross section to provide a V-shaped slot or trough 32 that is long enough to accommodate the articles being dispensed. The member can pivot around shaft 31 between a first position, shown in FIG. 2, for receiving in trough 32 a preselected number of articles from chute 25 and a second position, shown in FIG. 3, where the preselected number of articles are dispensed from the trough. The number of articles dispensed each time will depend on the number that can get into trough 32 and clear the bottom of the chute when the member 30 is rotated. In the embodiment shown, leg 30a of member 30 will engage the article in the chute that rests on the article in the trough and hold it in the chute until the member is rotated back to the position of FIG. 2. At this time, the next article will fall into the trough. When dispensing member 30 is in its second position as shown in FIG. 3, the article in the trough rolls down ramp 33 and comes to rest on curved supports 34 and 35 mounted on housing 12. Spring 36 is connected between the bottom of ramp 33 and dispensing member leg 30b to resiliently urge the dispensing member toward its first position.

Means are provided for rearranging the articles stacked in hopper 13 near opening 16 between walls 14 and 15 each time dispensing member 30 moves from its first to its second position to break up any bridge formed by two or more of the articles wedging between converging walls 14 and 15 above the opening, which bridge would stop the movement of the articles out of the hopper to the dispensing member. In the embodiment shown, the means to rearrange the articles includes hinge means 37 pivotally mounting the upper end of downwardly converging wall 15 of the hopper to wall 23 for pivotal movement of its lower edge toward opposite wall 14. The rearranging means further includes the mounting of wall 14 for movement generally in the plane of the wall away from pivotally mounted wall 15 in response to the movement of the pivotally mounted wall when any articles are wedged therebetween. In the embodiment shown, wall 14 is mounted for such movement on portion 22a of wall 22 by bolt 38 that extends through oblong hole 39 in wall portion 22a. Washer 38a spaces the upper part of wall 14 from wall portion 22a. The lower portion is so spaced by bent-over portion 14a along the lower edge of the wall.

Means for pivoting pivotally mounted wall 15 toward opposite wall 14 of hopper 13 are provided by studs 40 and 41 mounted on leg 30c of the dispensing member. The studs are moved through openings 42 and 43 in wall portion 23a and move wall 15 inwardly each time dispensing member 30 is moved to its second position. The movement of wall 15 inwardly into the hopper forces the rearrangement of the articles stacked within the hopper. Should one or more of the articles in the hopper be positioned to wedge between wall 15 and wall 14 and keep wall 15 from moving inwardly, wall 14 can move upwardly as required to allow wall 15 to complete its inward movement.

Portion 23a of wall 23 also serves to limit the distance pivotally mounted wall 15 can pivot away from opposite wall 14, thus enabling wall 15 to provide support for the articles stacked in the hopper.

Coin-operated means 45 is mounted in the front of housing 12 for actuating dispensing member 30. Coin-operated means 45 includes arm 46 that is slidable relative to slide block 47. The arm is supported for movement by block 47 and roller 50. By placing a coin in an opening (not shown) in arm 45 in a well-known manner, an operator can push arm 46 into the housing from the position shown in FIG. 2 to the position shown in FIG. 3. Roller 49 carried by the arm engages leg 30b of the dispensing member and rotates the member from its first to its second position dispensing an article. As explained above, this also actuates the means rearranging the articles in the hopper.

Base plate 51 is mounted in the lower portion of housing 12 and provides support for arm 46 through roller 50. Arm 46 is urged by spring 52 toward the position shown in FIG. 2 so that dispensing member 30 may be returned to its first position as shown in FIG. 2 by spring 36.

A locked tray 54 is mounted in the front of housing 12 below coin-operated means 45 to collect the coins as they drop through compartment 47 when the operator pushes in arm 46. Housing 12 also includes lid 56 which is secured by lock 57 at the rear end of the housing and by lip 58 fitting under flange 59 at the front end of the housing. The lip prevents intruders from avoiding lock 57 at the rear end of the housing by prying open the lid at the front end of the housing.

From the foregoing, it will be seen that this invention is one well adapted to attain all of the ends and objects hereinabove set forth, together with other advantages that are obvious and that are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for dispensing a preselected number of generally cylindrical articles of substantially uniform length and diameter, comprising a housing; a hopper of generally rectangular horizontal cross section mounted in the housing, said hopper having first and second walls that face and converge downwardly to form an opening in said hopper through which only one article at a time can pass; abutment means near the converging edge of said first wall and mounted on said first wall for freely sliding movement generally in the plane of said first wall towards and away from said converging edge, said abutment means actuated for movement by said cylindrical articles in response to a bridge of said articles, which bridge would stop the movement of articles from the hopper, said second wall including means mounted for pivotal movement toward said first wall and disposed in said hopper to force such bridged articles towards said abutment means; two facing walls that are spaced apart a distance slightly greater than the length of the articles so that they can be stacked in the hopper in a parallel, side-by-side relationship; dispensing means located below the opening in said hopper for dispensing a preselected number of the articles when actuated, including a member mounted below the opening in the hopper for pivoting between a first position for receiving a preselected number of articles through the hopper opening and a second position where the preselected number of articles are dispensed, while preventing the remaining articles in the hopper from passing through said opening; and means mounted in the housing for actuating the dispensing means, while causing said means mounted for pivotal movement to move toward said first wall to rearrange the articles stacked in the hopper near the opening each time the dispensing means is actuated and to urge such articles against said abutment means to break up any bridge formed by the articles.

2. The dispensing apparatus of claim 1 wherein said means for dispensing a preselected number of articles, and said actuating means are formed by a unitary member.

3. The dispensing apparatus of claim 1 further provided with a chute mounted below the hopper opening between the hopper and the dispensing means, said chute having a cross-sectional area substantially equal to the area of the opening so that articles located in the chute are in substantially vertical alignment.

4. The dispensing apparatus of claim 1 in which the means actuating the dispensing means is coin operated.

5. The apparatus of claim 1 further including means mounted on one of said first and second walls for varying the size of said opening in said hopper.

6. The dispensing apparatus of claim 1 wherein the dispensing means activates said pivotally mounted means by striking said pivotally mounted means.

7. The dispensing apparatus of claim 6 in which the dispensing means has a V-shaped slot which is positioned below the hopper opening when the member is in its first position so that said preselected number of articles can be received in the slot from the hopper to be dispensed when the member is moved to its second position.

8. The dispensing apparatus of claim 1 wherein said abutment means is a plate having a ridged edge at its end near the downwardly converging edge of said first wall and is inclined with respect to said first wall back to its other end.

9. The dispensing apparatus of claim 8 wherein said plate includes a slotted opening near said other end to permit sliding of said abutment means along said first wall from a first position wherein said raised edge is adjacent said opening in said hopper to a second position when an article is between said abutment means and said means mounted for pivotal movement, said abutment means adapted to return from said second position to said first position by force of gravity while causing such an article to be properly aligned adjacent said opening in said hopper.

* * * * *